United States Patent [19]
Crawford

[11] 3,751,814
[45] Aug. 14, 1973

[54] SLIDE CALIPER
[76] Inventor: Howard H. Crawford, 206 Raynolds, El Paso, Tex. 79905
[22] Filed: Sept. 28, 1971
[21] Appl. No.: 184,529

[52] U.S. Cl. ............................. 33/143 M, 33/111
[51] Int. Cl. ............................................. G01b 5/00
[58] Field of Search....................... 33/143 R, 143 I, 33/143 J, 143 K, 143 M, 166, 107, 111

[56] References Cited
UNITED STATES PATENTS
159,336   2/1875   Loar................................ 33/143 M
1,231,934 7/1917   Packet................................ 33/166

FOREIGN PATENTS OR APPLICATIONS
21,464    1892    Great Britain..................... 33/104

Primary Examiner—Harry N. Haroian
Attorney—Clarence A. O'Brien and Harvey B. Jacobson

[57] ABSTRACT

A slide caliper device having a rule provided with a plurality of inscribed, spaced, parallel, vertical and horizontal lines on the face thereof. Numerals indicating the numerator of fractional distances are inscribed in the spaces created by the vertical and horizontal lines. A slidable member or indicator engages the rule and also has indicia and numerals inscribed thereon indicating the denominator of fractional lengths. When the indicia of the indicator is moved to the point of intersection of horizontal and vertical lines on the rule, a direct reading between end portions of the rule and indicator is obtained.

2 Claims, 4 Drawing Figures

PATENTED AUG 14 1973 3,751,814

Howard H. Crawford
INVENTOR.

BY Clarence A. O'Brien
and Harvey B. Jacobson
Attorneys

SLIDE CALIPER

This invention relates to slide calipers. More particularly, the invention relates to a slide caliper by means of which linear lengths can be directly read by the average person.

BACKGROUND OF THE INVENTION

Many caliper devices are known in the art which provide a means of measuring the diameter of width of articles placed between the jaws or arms thereof. In most instances, these prior art caliper means are complex mechanisms requiring a certain degree of skill and proficiency for their use. Moreover, these prior art devices because of their complexity are generally expensive to manufacture. There has long been a need to provide a caliper means which is simply constructed, inexpensive to manufacture, and easily operated by the average person.

OBJECTS OF THE INVENTION

Accordingly, it is an object of the invention to provide a measuring device which furnishes at a glance the linear measurement of an article placed between end portions thereof.

It is a further object of the invention to provide a measuring device which is simple in construction, inexpensive to manufacture, and which provides a direct measurement of an article without undue complexity.

BRIEF DESCRIPTION OF THE INVENTION

The present invention provides a slide caliper wherein a generally rectangular member or rule is provided with a plurality of spaced parallel horizontal and spaced parallel vertical lines inscribed on one face thereof. The horizontal and vertical lines form spaces in which are inscribed numerals indicating the numerator of fractional linear lengths. A slidable member or indicator engageable with the rule and having indicia and numerals adjacent the indicia provides the denominator of fractional lengths when the indicia of the indicator is aligned with the intersection of horizontal and vertical lines on the rule. Means are provided for fastening the indicator in position so that a measurement thereon may be retained. In usage of the device the length or width of an article placed between end portions of rule and indicator can be directly read from the device.

The nature of the present invention having been set forth, there will now be presented a more detailed description in illustration but not limitation of the invention in the following specification and drawings in which.

Figure 1:
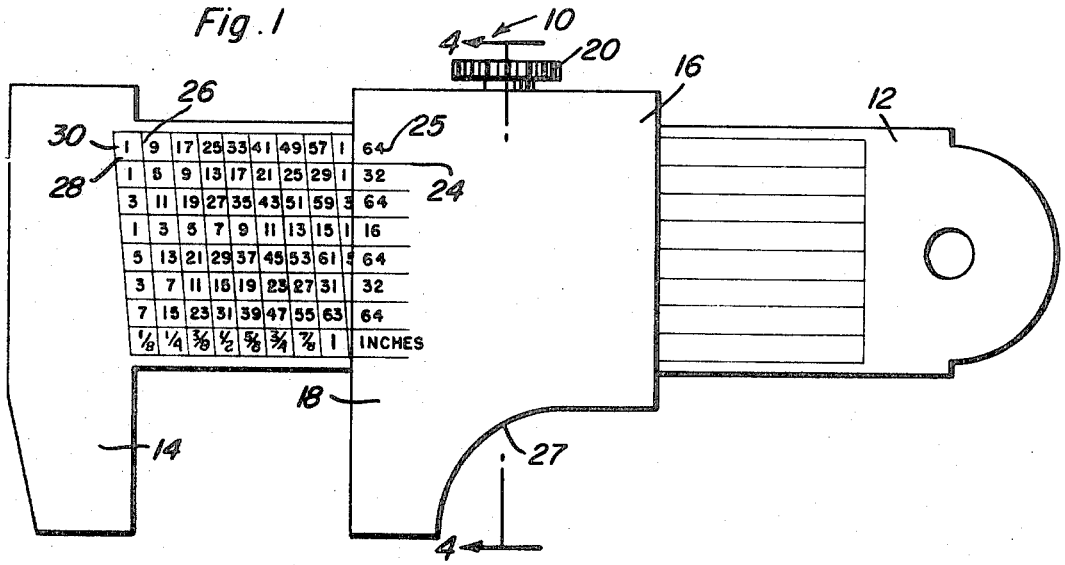
FIG. 1 is a front elevational view of the elements of the invention.

Turning now to FIG. 1, there is shown generally at 10 the slide caliper device of the invention comprising a first member or rule 12 which is flat and generally rectangular in configuration. Rule 12 for present purposes has a length of approximately two inches and a width of one inch. At one end of the rule 12 and depending therefrom there is formed a jaw or arm 14 which constitutes one measuring or end point of the slide caliper device. Rule 12 of the device may be made of metal, plastic, wood, cardboard or other suitable material. Inscribed on the face of rule 12 are a plurality of spaced parallel horizontal lines, one of which is shown at 28. The parallel horizontal lines as shown may run substantially the length of rule 12. Also inscribed on the face of rule 12 are a plurality of spaced parallel vertical lines, one of which is shown at 26. The vertical lines run the full width of the rule 12 and are slightly inclined from the horizontal axis of the rule so that the intersection of vertical and horizontal lines form an angle slightly greater than 90° as shown.

The spaces formed by the vertical and horizontal lines one of which is shown at 30 are inscribed with numerals which indicate the numerator of fractional lengths measured by the device. It is also to be noted that there are eight rows and columns of numerals. The numerals inscribed in each square constitutes the numerator of a fraction in 64ths of an inch. Therefore, the first column increases from 1/64 inch to 8/64 inch, the second column increases from 9/64 inch to 24/64 inch. Columns 3 through 8 ascend in a similar manner. In order to simplify the fraction obtained from the measuring device the indicia on both rule 12 and indicator 16 reduce the fraction to its lowest common denominator. For example, row 1, column 2 is inscribed with the numeral 1 and indicator 16 when aligned with the intersecting vertical and horizontal lines of this column and row reads 32. This provides a fraction of 1/32 inch which is the lowest common denominator of the fraction 2/64. In this manner, the inscribed numerals on rule 12 and indicator 16 always provide the fraction in terms of the lowest common denominator as well as in terms easily readable by the average person. Each space 30 is an equilateral parallelagram having ⅛ inch by ⅛ inch dimension. Thus, movement from the first column to the eighth column constitutes a distance or length of one inch measureable in increments of ⅛ inch. However, movement of the indicator between intersecting horizontal and vertical lines is always 1/64 inch. As stated above, the rule 12 has a length of approximately two inches. Accordingly, there is provided a second group of columns of numerals ranging from 9 through 16 which also constitutes a distance or length of one inch. Rule 12 also comprises a heel or stop means 32.

It is understood that jaw 14 and heel 32 may be made integral portions of rule 12 or separate elements attached thereto. Any variation of these elements would be in the purview of the invention as understood by those skilled in the art.

Figure 4:
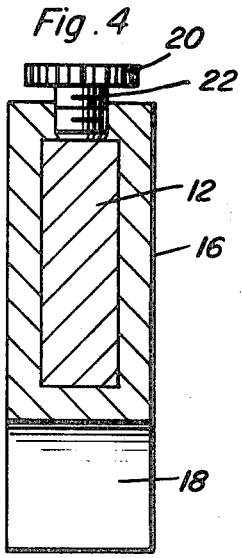
FIG. 4 is a view taken along the line 4—4 of FIG. 1 showing the details of the engagement of the indicator with the rule.

A slidable member or indicator 16 is adapted to slidably engage rule 12 and comprises a jaw 18 depending therefrom which constitutes the other measuring or end point of the slide caliper device. Also mounted on indicator 16 is a knurled headed fastening means 20 which as shown in the side elevational view of FIG. 4 has a screw shank portion 22 attached thereto which extends through the top of indicator 16 to lock the indicator 16 into any selected setting or position.

Turning again to FIG. 1, indicator 16 has indicia 24 inscribed on the end thereof which faces the jaw 14 and heel 32 of rule 12. Above indicia 24 are numerals one of which is shown at 25. The numerals 25 on indicator 16 represent the denominator of fractional lengths measurable by the measuring device 10. Specifically, the numerals of the indicator measure fractional lengths in 1/64 inch dimension.

As seen in FIG. 1, indicia 24 are aligned with the parallel horizontal lines 28 of rule 12. An arcuate-shaped portion 27 adjacent jaw 18 is designed so that the slide may be easily moved over rule 12 by the thumb of the user. When the indicator is moved to its utmost left position it is stopped by heel 32 and prevented from disengagement with rule 12. Stop means may also be provided at the end opposite of heel 32 of rule 12 to prevent disengagement of the indicator when rule 12 is moved to the far right position.

Figure 2:
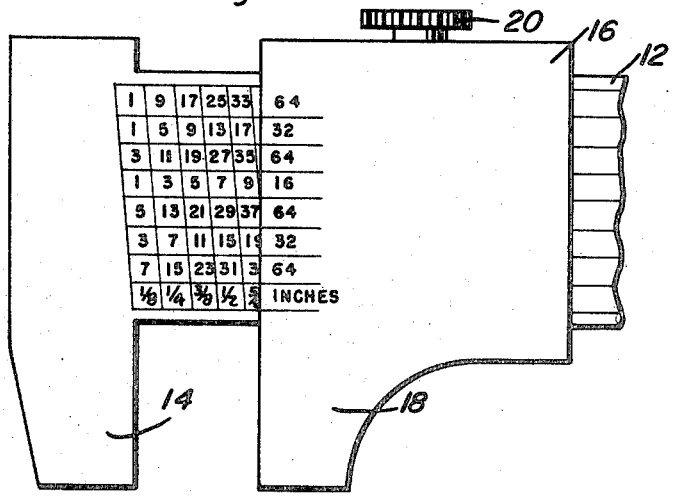
FIG. 2 is a sectional elevational view of the invention showing a first alignment of the indicator with the rule to effect a first measurement.
Figure 3:
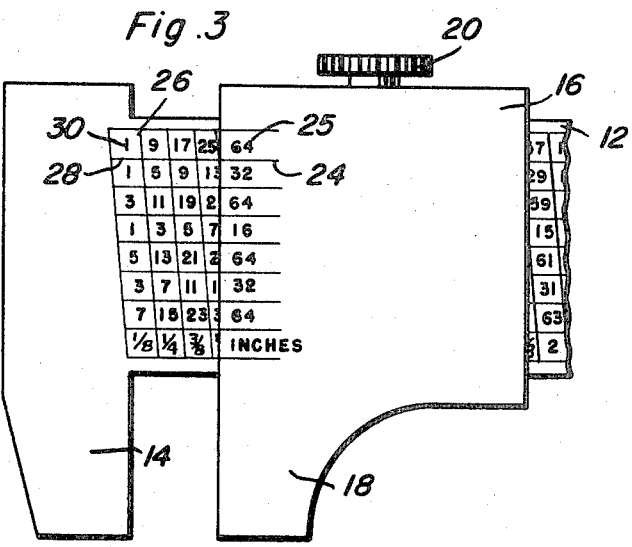
FIG. 3 is a view similar to FIG. 2 showing a second measurement.

In reading measurements from measuring device 10, indicator 16 is moved to the left or right until one of its indicia is aligned with the point at which a horizontal and vertical line intersect. At this point, the numerator of the fraction is read from rule 12 and the denominator of the fraction is read from indicator 16. This is illustrated, by way of example, in FIGS. 2 and 3. In FIG. 2, indicator 16 has an indicia aligned with numeral 9 on rule 12 and the numeral 16 on indicator 16. Thus, the space between jaw means 14 and 18 represent a linear distance or length 9/16 inch which is the lowest common denominator of the fraction 36/64th. In FIG. 3, indicator 16 has an indicia 64 aligned with numeral 25 on rule 12. Hence, the linear distance between jaw means 14 and 18 in this case is 25/64 inch.

The measuring device 10 may be used to measure the outside diameter of small tubing. In such event, the tubing is placed between jaw means 14 and 18 and the jaws closed about the tubing. Then the numerator of the fractional diameter length may be read from the rule 12 and the denominator from the indicator 16. When the device is to be employed as a gauge a setting is made on the caliper device and the fastening means tightened to maintain the setting and then the article to be measured is placed between jaw 14 and 18 to ascertain its conformity to the setting or to a known standard.

Since the vertical lines on the rule 12 are slightly inclined, intersecting horizontal and vertical lines may be employed as means for measuring distances between the jaw means of the rule 12 and indicator 16 without inscribing the length along the horizontal axis of the rule 12. This arrangement also facilitates discernment of the fractional distance without the confusion and complexity which attend other caliper devices.

From the foregoing, a slide caliper device has been disclosed which may be employed generally as a measuring device. It will occur to those skilled in the art that the present invention may be used in other applications. Also other variations, modifications and adaptations of the present invention will become apparent to those skilled in the art and such as come within the purview and scope of the appended claims are considered to be embraced by the present invention.

What is claimed as new is as follows:

1. In a measuring device including a rule having a plurality of spaced parallel horizontal lines and spaced parallel vertical lines inscribed thereon, a first jaw means on said rule, an indicator means slidably mounted on said rule, said indicator including a plurality of vertically spaced apart indicia in alignment with said horizontal lines of said rule, and a second jaw means on said indicator, whereby said indicia on said indicator in cooperation with said horizontal and vertical lines on said rule provide an indication of the fractional linear distance between said first and second jaw means, the improvement comprising said vertical lines being inclined to form an angle with said horizontal lines of greater than 90°, said angle opening upwardly and in a direction away from said first jaw means, said horizontal and inclined vertical lines intersecting to define a series of spaces in which numerals representing the numerator of the fractional linear distance between said first and second jaw means are inscribed, and said indicia including numerals associated therewith inscribed on said indicator representing the denominator of the fractional linear distance between said first and second jaw means, whereby upon alignment of one of said indicia with an intersection of said horizontal and vertical lines, the numerator of the fractional linear distance between said first and second jaw means appears from the numeral in the space on said rule immediately adjacent said indicia and the denominator of said fractional linear distance appears from the numeral on said indicator associated with said indicia.

2. A measuring device, as claimed in claim 1, further including means for fastening said indicator in position on said rule.

* * * * *